United States Patent [19]
Strauss

[11] Patent Number: 5,669,580
[45] Date of Patent: Sep. 23, 1997

[54] SENSOR DEVICE FOR A MISSILE

[75] Inventor: Werner Strauss, Nurnberg, Germany

[73] Assignee: Diehl GmbH & Co., Nurnberg, Germany

[21] Appl. No.: 558,832

[22] Filed: Nov. 15, 1995

[30] Foreign Application Priority Data

Dec. 3, 1994 [DE] Germany .............. 44 43 134.1

[51] Int. Cl.$^6$ .................. F41G 7/00; F41G 7/22
[52] U.S. Cl. .................. 244/3.16; 356/139.07; 356/152.2
[58] Field of Search .................. 244/3.15, 3.16; 356/139.03, 152.2, 139.07

[56] References Cited

U.S. PATENT DOCUMENTS

| | | | |
|---|---|---|---|
| 3,439,170 | 4/1969 | Zagone et al. | 356/139.03 |
| 4,231,533 | 11/1980 | Durig | 244/3.16 |
| 4,270,044 | 5/1981 | Elwell, Jr. | 250/201 |
| 4,386,848 | 6/1983 | Clendenin et al. | 356/5 |
| 4,701,602 | 10/1987 | Schaefer et al. | 250/201 |
| 4,770,482 | 9/1988 | Sweeney et al. | 350/96.1 |
| 4,796,834 | 1/1989 | Ahlstrom | 244/3.16 |
| 5,088,818 | 2/1992 | Nicholson | 356/152 |
| 5,456,179 | 10/1995 | Lamelot | 102/213 |

FOREIGN PATENT DOCUMENTS

| | | |
|---|---|---|
| 2313087 | 9/1973 | Germany . |
| 2853779 | 2/1988 | Germany . |
| 3728385 | 3/1989 | Germany . |
| 3741856 | 4/1989 | Germany . |
| 3241896 | 4/1992 | Germany . |

Primary Examiner—Michael J. Carone
Assistant Examiner—Christopher K. Montgomery
Attorney, Agent, or Firm—Scully, Scott, Murphy & Presser

[57] ABSTRACT

Described is a sensor device (10) for a missile (16) having a matrix detector (12) and an electronic evaluation circuit connected thereto. A ray source (20) is stationarily arranged on the missile (16). Provided between the ray source (20) and the matrix detector (12) which is stationarily provided on the missile (16) is a gyro optical device (22) which is cardanically mounted in the missile (16). The sensor device may be employed to determine the roll position and roll rate of a missile (16).

7 Claims, 1 Drawing Sheet

SENSOR DEVICE FOR A MISSILE

BACKGROUND OF THE INVENTION

1. Field of the Invention

The invention concerns a sensor device for a missile, particularly for an autonomously guided missile, and which includes a radiation-sensitive matrix detector and an electronic evaluation circuit which is connected to the matrix detector.

2. Discussion of the Prior Art

A roll position measuring device for spin-stabilised missiles and projectiles or shells having a sensor arranged eccentrically with respect to the axis of the missile for generating a signal dependent on the instantaneous roll position, and an electronic evaluation circuit connected on the output side of the sensor for further processing of that signal is known from the applicants' DE 28 53 779 C3. Therein the sensor comprises a piezoceramic cell and a solid body which is arranged movably in an approximately radial direction relative to the axis of the missile, on the side of the piezoceramic cell which is towards the axis of the missile, and on the basis of rotation of the missile generates a signal which is correlated with the instantaneous roll position of the missile in relation to the centre of the earth.

Optronic interference-protected missile location in accordance with the multiple travelling-aperture method on the basis of an LC- or DMD-matrix with inherent location-determining property is known from DE 37 41 856 C1. In that case the individual image points of the LC- or DMD-matrix are individually modulated, in an 'n.m.'-environment, around the light set point, controlled by a location-determining computer.

A method for compensating for the wobble movement of a rotating body, which that body performs relative to its axis of rotation, is known from DE 23 13 087 A1. That compensation method involves the use of a sensor which outputs a sensor signal and which responds to the orientation with respect to the reference axis. In that procedure the body is turned into positions which are displaced relative to each other through 180 degrees of angle and in which the associated sensor signal is taken off. The sensor signals which correspond to positions that are displaced relative to each other through 180 degrees of angle are electronically averaged in order to provide for equalisation for the wobble movement relative to the precise axis of rotation. The sensor signals averaged in that way are displayed as an angle relationship between the precise axis of rotation and the reference axis.

DE 32 41 896 C2 discloses a method of improving image processing in optronic missile detection apparatuses, in which the missiles are detected with an optronic image-recording device, the missile images supplied by the image-recording device are correlated in a correlator with predetermined reference signals, the correlation signals corresponding to point targets output ted by the correlator are processed in a data processing apparatus with cycle statistics and target trace, and the output signals of the data processing apparatus are outputted to an alarm device.

A method for the extraction of a point target from a video signal and a circuit arrangement for carrying out that method is known from DE 37 18 098 C2.

DE 37 28 385 A1 describes an apparatus for ascertaining the initial roll position of a projectile or shell in a launch tube. For that purpose a gravitational pendulum is provided which is capable of swinging about the longitudinal axis of the projectile and whose angular position, relative to the projectile, is sensed magnetically, optically or electrically and stored in the form of an electric signal in the projectile.

SUMMARY OF THE INVENTION

The object of the present invention is to provide a sensor device of the kind set forth in the opening part of this specification, in which the level of structural expenditure is relatively low so that it is possible to provide a missile, in particular an autonomously guided missile, with simple means.

In a sensor device pursuant to the invention, the foregoing object is attained in that a ray source is arranged stationarily on the missile, and that a gyro-optical device is located between the ray source and the matrix detector, wherein the gyro-optical device is cardanically mounted in the missile.

The sensor device according to the invention has the advantages that it is of a relatively simple structure and is suitable for precisely ascertaining the respective positional angle and the respective rotational or roll rate of a missile by means of gyro-stabilised optical means and matrix detector which is fixed to the missile.

Autonomously guided missiles with imaging search head which usually involves an IR-search head involve the use of IR-matrix detectors which are usually cooled, in the search phase. Such detectors have for example 128.128 pixel elements. By means of the sensor device according to the invention, it is possible to use the matrix detector which is preferably an IR-matrix detector in the flight phase of the projectile, which occurs in respect of time prior to the search phase, for determining the flight position and the roll speed, that is to say the speed of rotation, of the missile. The sensor device according to the invention is suitable therefore not only for determining the flight position and rate of rotation in the flight phase which for example may involve a glide phase in order to achieve a maximum flight distance, but also for corresponding determination in the active target-search phase. For that purpose, the invention provides for using an infra-red light source which is fixedly installed in the missile and which is preferably of dot configuration, and which is for example an LED infra-red diode. By way of a cardanically mounted, rotating lens system or by way of a cardanically mounted, rotating plane mirror, the image of the light source is formed on the matrix detector in the form of a moved light dot which corresponds to the respective position angle and the respective rate of rotation; as already mentioned above, the matrix detector is preferably an IR-matrix detector. As the cardanically mounted gyro optical system with the gyro rotor which is driven at a correspondingly high speed of rotation forms an inertial axis which is fixed in relation to space, the missile which is equipped with the sensor device according to the invention moves and therewith the light dot generated by the dot light source moves on the matrix detector which is fixed with respect to the missile, relative to the angular speed vector of the gyro rotor, which vector is fixed in relation to space and coincides with said inertial axis. This means that the radial position or speed of the light dot on the matrix detector can be evaluated in real time by means of the electronic evaluation circuit which is connected to the matrix detector, and supplies direct information about the currenttime flight angle positions and speeds of rotation of the missile. Advantageously therefore no additional flight status sensors such as position and rate gyros are required for ascertaining the respective flight status of the missile, as with the device according to this invention all the three flight orientations (angles of roll, nick and yaw) as well as all the three turn speeds of the airframe can be investigated.

BRIEF DESCRIPTION OF THE DRAWINGS

Further details, features and advantages will be apparent from the following description of two embodiments, diagrammatically shown in the drawing, of the sensor device according to the invention for an autonomously guided missile which may be for example a mortar projectile. In the drawing.

DETAILED DESCRIPTION OF PREFERRED EMBODIMENTS

Figure 1:
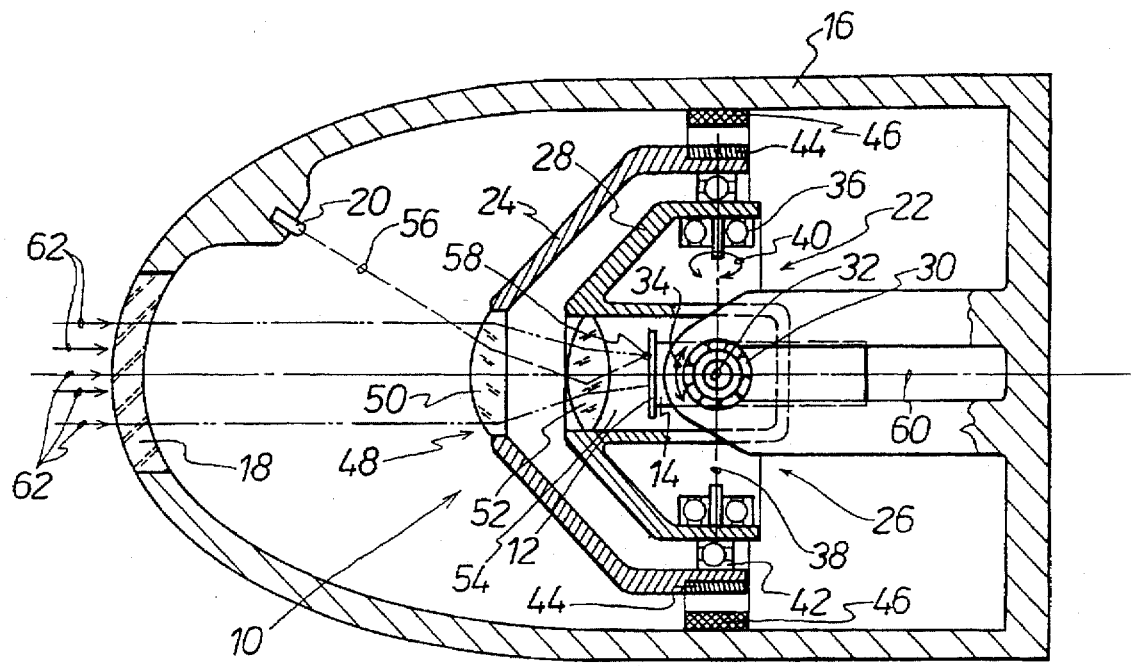
FIG. 1 is a view in longitudinal section of a first embodiment of the sensor device.

FIG. 1 shows a first embodiment of the sensor device 10 for an autonomously guided missile, comprising a radiation-sensitive matrix detector 12 which is preferably an IR-matrix detector and which is disposed stationarily. A cooling element 14 which can be a so-called Joule-Thomson coller is connected to the matrix detector 12 in heattransmitting relationship. The matrix detector 12 is connected to an electronic evaluation circuit (not shown).

A ray source 20 which is preferably an IR-dot light source is stationarily arranged on the missile 16 or the search head thereof which is provided with a dome portion 18. The light source can be provided for example by an LED infrared diode, A gyro optical device 22 which is cardanically mounted in the missile 16 is provided between the ray source 20 which is arranged stationarily in relation to the missile 16, and the matrix detector 12 which is also disposed stationarily in relation to the missile 16. The gyro optical device 22 has a gyro rotor 24 which is cardanically mounted in the missile 16 by means of a cardan joint arrangement 26. The cardan joint arrangement 26 has a joint element 28 which, by moans of a first mounting device 30, is pivotable about a first cardan axis 32 which is perpendicular to the plane of the drawing in FIG. 1, as is indicated by the double-headed arcuate arrow 34. The joint element 28 is also pivotable about a second mounting device 36 at a second cardan axis 38 which is perpendicular to the first cardan axis 32 and which lies in the plane of the drawing in FIG. 1, as is indicated by the double-headed arcuate arrow 40. The joint element 28 is rotatably mounted on the gyro rotor 24 by means of a third mounting device 42. For the rotational drive of the gyro rotor 24, it is provided for example with permanent magnets 44 which are provided in the vicinity of a drive coil 46 arranged on the missile 16 or the search head thereof in a stationary position.

The gyro rotor 24 has a central opening 48 in which a first optical lens element 50 is arranged. It is for example of a plane-convex configuration.

A second optical lens element 52 is fixed in the central opening 54 of the joint element 28 of the cardan joint device 26. This second lens element 52 is for example in the form of a biconvex lens.

A thin broken line 56 diagrammatically indicates the path of the radiation emitted by the ray source 20 to the matrix detector 12. The light dot or point which impinges on the matrix detector 12 is denoted by reference numeral 58. That light dot 58 is laterally displaced relative to the inertial axis 60 which is fixed in relation to space. The target signature which enters through the dome portion 18 is diagrammatically indicated by the arrows 62.

Figure 2:
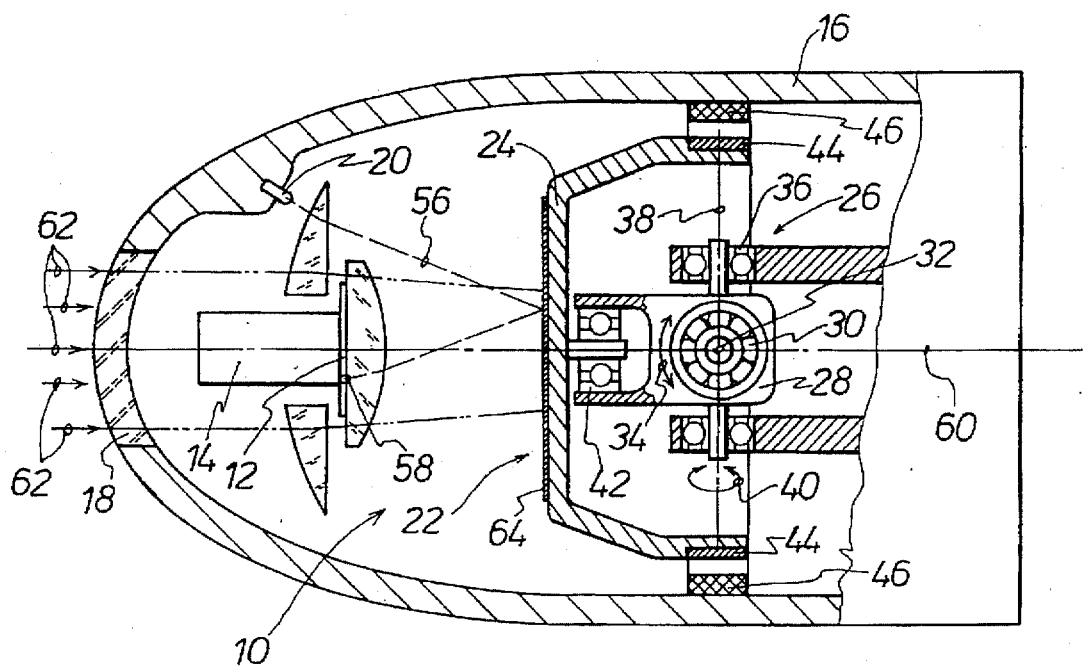
FIG. 2 is a partly sectional view similar to that shown in FIG. 1, illustrating a second embodiment of the sensor device.

FIG. 2 is a partly sectional view showing a second embodiment of the sensor device 10 with stationary matrix detector 12 which is coupled in heat-conducting relationship to a cooling element 14. The matrix detector 12 is arranged in the vicinity of the dome portion 18 of the missile 16 behind the dome portion 18. A ray source 20 is stationarily provided on the missile 16, as in the structure shown in FIG. 1. A gyro optical device 22 serves to deflect to the matrix detector 12 the radiation which is emitted by the ray source 20 and the ray path of which is identified by reference numeral 56. For that purpose, as shown in FIG. 2, the gyro optical device 22 of the sensor device 10 is formed with a plane mirror 64 which is disposed on the gyro rotor 24 of the gyro optical device 22. The gyro rotor 24 is provided with permanent magnets 44 which are disposed in the vicinity of a drive coil 46 stationarily arranged on the missile or on the target search head thereof. The gyro rotor 24 is cardanically mounted by means of a third mounting device 42 at a cardan joint device 26 which has a joint element 28. In this embodiment also the joint element 28 is cardanically mounted at a first mounting device 30 about a first cardan axis 32 and at a second mounting device 36 about a second cardan axis 38.

I claim:

1. A sensor device for an autonomously guided missile, comprising a radiation-sensitive matrix detector; an electronic evaluation circuit operatively connected to the matrix detector, a ray source (20) being stationarily arranged on the missile (16), and a gyro-optical device (22) cardanically mounted on the missile being operatively located stationarily so as to deflect a beam emitted from said ray source and to direct said beam between the ray source (20) and the matrix detector (12), and said gyro-optical device (22) includes a gyro-rotor (24) which is mounted in the missile (16) by cardan joint means (26).

2. A device according to claim 1, wherein the ray source (20) comprises an IR-dot light source.

3. A device according to claim 1, wherein the gyro-optical device (22) includes a plane mirror (64) arranged on the gyro-rotor (24).

4. A device according to claim 1, wherein the gyro-optical device (22) includes at least one lens element (50) arranged on the gyro-rotor (24).

5. A device according to claim 4, wherein the gyro-optical device (22) includes at least one further lens element (52) arranged on the cardan joint means (26).

6. A device according to claim 1, wherein the gyro-rotor (24) is electromagnetically coupled to a stationary drive coil (46) of the missile (16).

7. A device according to claim 1, wherein the matrix detector (12) is connected to a cooling element (14).

* * * * *